United States Patent [19]

Weidman

[11] 4,339,104
[45] Jul. 13, 1982

[54] FLOOR STAND MOUNTED MIRROR

[76] Inventor: Marilyn V. Weidman, 615 Clifford St., Allentown, Pa. 18103

[21] Appl. No.: 143,088

[22] Filed: Apr. 23, 1980

[51] Int. Cl.³ .................. F16M 11/00; A47F 7/14
[52] U.S. Cl. ................................. 248/407; 248/474
[58] Field of Search ............... 248/407, 422, 423, 474

[56] References Cited

U.S. PATENT DOCUMENTS

| | | |
|---|---|---|
| 5,094 | 10/1872 | Mathewson .................... 248/407 |
| 404,110 | 5/1889 | Pincus ........................ 248/474 X |
| 507,178 | 10/1893 | Smith ......................... 248/407 X |
| 566,809 | 9/1896 | Strong ........................ 248/407 X |
| 789,152 | 5/1905 | Hasbrouck .................... 248/474 |
| 814,101 | 3/1906 | Weel .......................... 248/474 |
| 1,029,812 | 6/1912 | Lurtz ......................... 248/474 X |
| 1,263,955 | 4/1918 | Stansbury .................... 248/474 X |
| 1,726,372 | 8/1929 | Stoll ......................... 248/423 X |
| 2,017,472 | 10/1935 | Re ............................ 248/474 |

*Primary Examiner*—Louis Rimrodt
*Attorney, Agent, or Firm*—Harvey B. Jacobson

[57] ABSTRACT

An upright standard is provided including upper and lower relatively telescoped and slidably adjustable end portions. The lower end of the lower end portion includes a horizontally enlarged floor engageable base and the retention structure is operatively connected between the upper and lower end portions for releasably preventing downward movement of the upper end portion relative to the lower end portion from selected extended positions of the upper end portion relative to the lower end portion. The upper end of the upper end portion rotatably supports mirror mounting structure for angular displacement relative to the upper end portion about an upstanding axis and a mirror element supporting frame is supported from the mounting structure for angular adjustment about a horizontal axis generally paralleling the mirror element. The retention structure for releasably retaining the upper standard end portion against downward movement relative to the standard lower end portion is ineffective to prevent upward extension of the standard upper end portion relative to the lower end portion thereof and the mirror element supporting frame supports a pair of back-to-back mirror elements therefrom with one of the mirror elements comprising a plane mirror element and the other mirror element comprising a concave mirror element.

4 Claims, 6 Drawing Figures

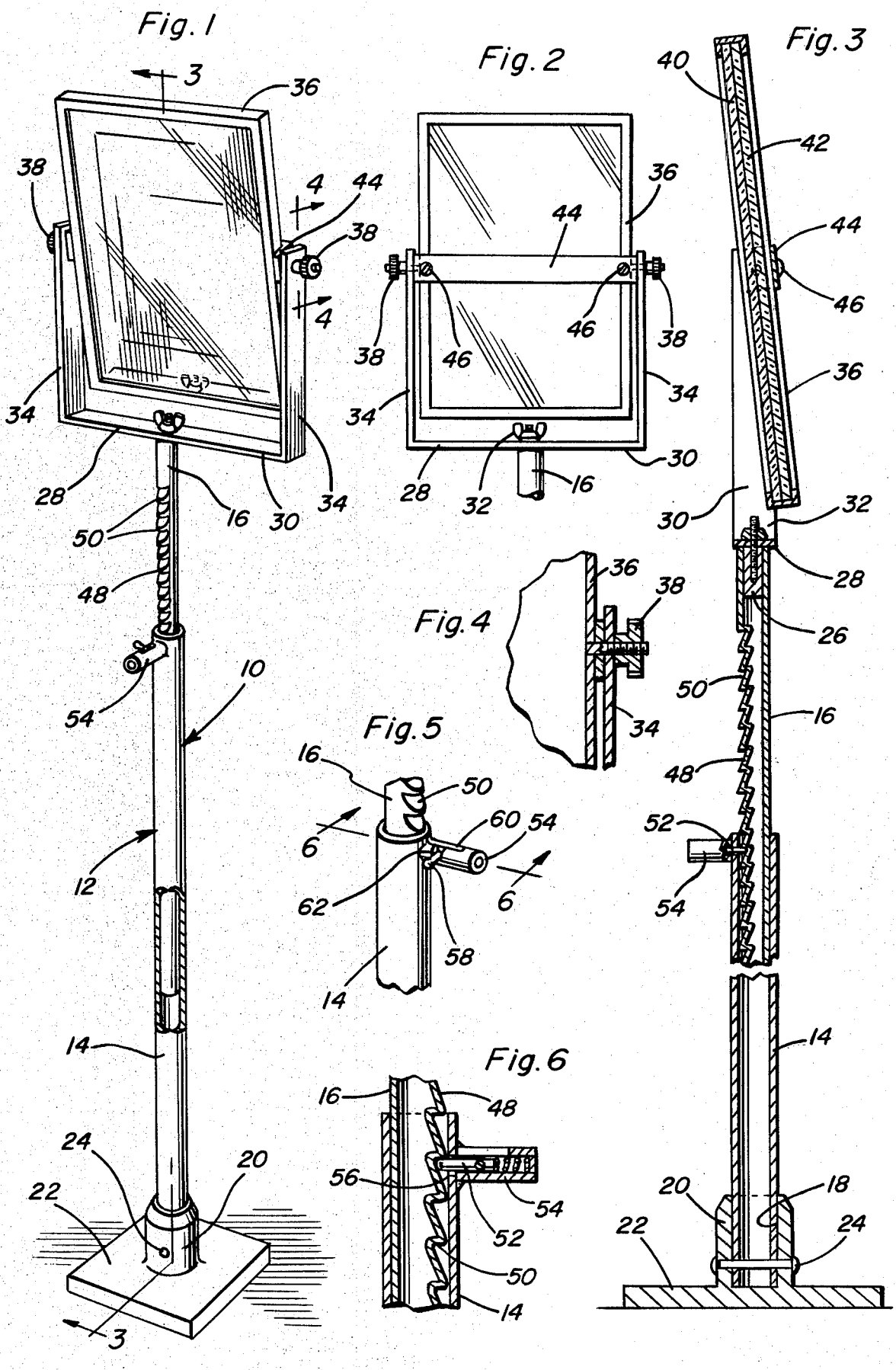

FLOOR STAND MOUNTED MIRROR

BACKGROUND OF THE INVENTION

Various forms of height adjustable mirror supporting structures heretofore have been designed, but these structures have not been constructed in a manner whereby they are readily portable from one location in a room to a second location therein or from one room to another. In addition, these previously known forms of mirror supporting structures include height adjustment retaining features which are difficult to operate. Accordingly, a need exists for an improved form of height adjustable mirror support structure which may be readily transported from one location to another and functional to enable height adjustment of the supported mirror with a minimum amount of effort.

Examples of previously known forms of height adjustable mirror supporting structures as well as other similar constructions including some of the general structural and operational features of the instant invention are disclosed in U.S. Pat. Nos. 404,110, 789,152, 814,101, 1,029,812, 1,263,955 and 2,017,472.

BRIEF DESCRIPTION OF THE INVENTION

The floor stand of the instant invention has been specifically designed to provide a mirror assembly which may be conveniently utilized for substantially all forms of personal grooming requiring the use of a mirror. The base is sufficiently horizontally enlarged to provide a stable support for the standard and mirror assemblies supported therefrom and is devoid of outwardly protruding portions thereof over which a person using the mirror or a child moving about in the immediate area may trip. The mirror is particularly useful in hair grooming and may be utilized in conjunction with a dresser mirror or the like to view the rear side of the user. Inasmuch as the mirror is stationarily supported from the floor, the user need not hold the mirror behind his head with one hand while attempting to groom his or her hair through the utilization of a dresser mirror or the like. Also, the mirror is adjustable in height and may therefore be used while standing or while seated and may further be temporarily positioned and adjusted for use to view into an adjacent room such as a nursery while out of direct line of sight of that room.

The main object of this invention is to provide a portable and height adjustable mirror assembly conveniently usable in numerous environments and for different purposes.

Another object of this invention is to provide a mirror assembly in accordance with the preceding object and constructured in a manner whereby a stable support for the mirror element thereof will be provided independent of a large cumbersome base.

Yet another object of this invention is to provide a mirror assembly including structure by which the height of the mirror element thereof may be readily adjusted.

Yet another important object of this invention is to provide a mirror construction which may be readily stored in a small closet area when not in use.

A final object of this invention to be specifically enumerated herein is to provide an improved floor standing mirror construction in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, which like numerals refer to like parts throughout.

BRIEF DESCRIPTION OF THE DRAWINGS

FIG. 1 is a perspective view of the mirror construction with a portion of the standard thereof being broken away and illustrated in vertical section;

FIG. 2 is a rear elevational view of the upper portion of the mirror construction;

FIG. 3 is a fragmentary enlarged vertical sectional view taken substantially upon the plane indicated by the section line 3—3 of FIG. 1;

FIG. 4 is an enlarged fragmentary vertical sectional view taken substantially upon the plane indicated by the section line 4—4 of FIG. 1;

FIG. 5 is an enlarged fragmentary perspective view of the retention structure for releasably securing the standard in adjusted extended position; and FIG. 6 is an enlarged fragmentary vertical sectional view taken substantially upon the plane indicated by the section line 6—6 of FIG. 5.

DETAILED DESCRIPTION OF THE INVENTION

Referring now more specifically to the drawings, the numeral 10 generally designates the mirror construction of the instant invention. The construction 10 includes a standard assembly referred to in general by the reference numeral 12 and including upper and lower tubular end portions 14 and 16. The lower end of the lower end portion 14 is secured within an upwardly opening recess 18 defined in an upstanding fitting 20 carried by a horizontally enlarged square base plate 22. A diametric pin 24 is secured through diametric bores in the fitting 20 and corresponding diametric bores in the lower tubular end portion 14.

The upper end of the upper tubular end portion 16 has a plug 26 secured therein and the lower bight portion 28 of a U-shaped support frame 30 is pivotally supported from the plug 26 by a suitable pivot fastener 32, whereby the frame 30 may be angularly adjusted about an axis substantially coinciding with the longitudinal center axis of the upper tubular end portion 16. The upstanding support arms 34 of the U-shaped support frame 30 which project upwardly from the opposite ends of the bight portion 28 are suitably apertured and pivotably support a rectangular mirror supporting frame 36 therebetween through the utilization of adjustable friction-type pivot fasteners 38. The frame 36 supports back-to-back plane and concave mirror elements 40 and 42 therefrom, a center brace 44 being secured across the concave mirror element side of the frame 36 by suitable fasteners 46 and pivot fasteners 38 supporting the opposite ends of the brace 44 from the upper ends of the arms 34.

The tubular upper end portion 16 has a longitudinally extending zone 48 thereof which is molded or otherwise shaped to the define a plurality of longitudinally spaced downwardly opening teeth 50 and a spring biased ratchet pawl 52 is slidably supported in a laterally outwardly projecting housing 54 anchored relative to the upper end of the lower tubular end portion 14. The pawl 52 projects through an opening 56 (see FIG. 6) provided therefor in the lower tubular end portion 14 and is engageable with the teeth 50 to selectably releasably lock the upper tubular end portions 16 in predetermined extended position relative to the lower tubular end portion 14 against downward sliding movement relative thereto. However, the teeth 50 and ratchet pawl 52 coact in a manner whereby upward extension of the upper tubular end portion 16 may be effected without manual withdrawal of the ratchet pawl 52 by the handle 58 thereof which projects outwardly through a slot 60 formed in the housing 54. The slot 60 includes a laterally directed inner end portion 62 (see FIG. 5) into which the handle 58 may be swung in order to lock the pawl 52 against retraction from the upper tubular end portion 16 to thus also lock the upper tubular end portion 16 against upward shifting relative to the lower tubular end portion 14.

In operation, the mirror construction 10 may be readily stored in a small closet area, but may be removed from the closet or other storage area and positioned as desired on the floor or rug. The height of the mirror support frame 36 above the base plate 22 may be readily adjusted as desired by the telescopic connection between the upper tubular end portion 16 and the lower tubular end portion 14 and the angulation of the frame 36 relative to the horizontal may be varied as desired.

The major components of the mirror construction 10 except for the mirror elements 40 and 42 thereof may be constructed of metal, but other suitable materials such as high strength plastics may also be used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A floor stand mounted mirror construction, said construction including an upright standard having upper and lower relatively telescoped and slidably adjustable end portions, the lower end of the lower end portion including a horizontally enlarged floor engaging base, retention means operatively connected between the upper and lower end portions for releasably preventing downward movement of said upper end portion relative to said lower end portion from said selected extended positions of said upper end portion relative to said lower end portion, a support frame, means mounting said support frame on the upper end portion of said standard for angular adjustment about an upstanding axis relative to said standard, a mirror mounting frame supported from said support frame for angular displacement about a horizontal axis, said mirror mounting frame including at least one mirror element thereof generally paralleling the axis of angular adjustment of said mirror mounting frame relative to said support frame, said upper end portion being cylindrical, said retention means including longitudinally spaced downwardly inclined and facing ratchet teeth spaced longitudinally along one side, only, of said upper end portion, said lower end portion being tubular and having said upper end portion rotatably and telescopingly received therein, said retention means further including a pawl supported from one wall portion of said lower end portion for guided oscillation generally radially of said wall portion between a first inner position engaged with said teeth when said one side and wall portion are registered and a second outer position retracted outwardly from said teeth, means operatively connected between said pawl and lower end portion yieldingly biasing said pawl toward said first position, said pawl and lower end portion including coacting structure operative to selectively releasably lock said pawl in said first and second positions, said upper end portion being rotatable relative to said lower end portion to angularly displace said one side out of registry with said one wall portion, said upper end portion, exclusive of said one side being smooth, whereby when said one side is angularly displaced out of registry with said one wall portion said upper end portion may be longitudinally shifted, in either an up or down direction, relative to said lower end portion even when said pawl is yieldingly biased into engagement with said upper end portion.

2. The combination of claim 1 wherein said horizontally enlarged floor engaging base comprises a low vertical height horizontal base plate carried by the lower end of said lower end portion and free of portions projecting outwardly therefrom over which a user or child moving about in immediate area may trip.

3. The combination of claim 1 wherein said support frame comprises an upwardly opening U-shaped frame including a lower horizontal bight portion and a pair of upwardly projecting arms supported from the opposite ends of said bight portion, and friction-type pivot fastener means pivotably supporting the intermediate portion of said bight portion from the upper terminal end of said upper end portion.

4. The combination of claim 3 wherein said mirror mounting frame supports a pair of mirror elements therefrom, one of said mirror elements comprising a plane mirror element and the other mirror element comprising a concave mirror element.

* * * * *